United States Patent [19]

Nagy

[11] 3,755,187
[45] Aug. 28, 1973

[54] PREPARATION OF HALOPHOSPHATE PHOSPHORS USING DIGESTION FORMED APATITE

[75] Inventor: Rudolph Nagy, Lac du Flambeau, Wis.

[73] Assignee: Westinghouse Electric Corporation, Pittsburgh, Pa.

[22] Filed: Dec. 6, 1971

[21] Appl. No.: 205,128

[52] U.S. Cl. .......................................... 252/301.4 P
[51] Int. Cl. .............................................. C09k 1/36
[58] Field of Search ................ 252/301.4 P, 301.6 P

[56] References Cited
UNITED STATES PATENTS 3,538,014  11/1970  Wachtel ...................... 252/301.4 P
3,575,876   4/1971  Piper ........................... 252/301.4 P

FOREIGN PATENTS OR APPLICATIONS 741,324  11/1955  Great Britain ................ 252/301.4 P Primary Examiner—Oscar R. Vertiz
Assistant Examiner—J. Cooper
Attorney—A. T. Stratton et al.

[57] ABSTRACT

Apatite-type alkaline-earth metal halophosphate phosphors are prepared by a double digestion process. Unactivated alkaline-earth metal fluoro-apatite is formed by digesting an alkaline-earth metal acid phosphate and a fluoride of the same alkaline-earth metal. The unactivated fluoro-apatite is then digested in a solution containing activators to form activated alkaline-earth metal fluoro-apatite which is further processed to provide the phosphor. An improved apatite crystal structure is obtained by forming the apatite structure before the activators are added and the digesting of acid phosphates and fluorides provide a fast and inexpensive method of forming such an apatite. Preferably, the alkaline-earth metal is calcium and chlorine is added during firing so that a calcium fluoro-chloro-phosphate phosphor is formed.

7 Claims, 1 Drawing Figure

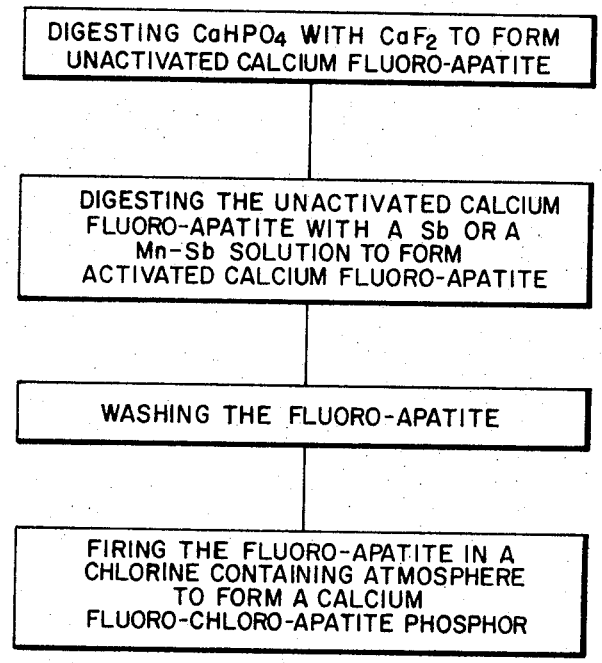

PREPARATION OF HALOPHOSPHATE PHOSPHORS USING DIGESTION FORMED APATITE

CROSS-REFERENCE TO RELATED APPLICATIONS

In copending applications Ser. No. 77,701, filed Oct. 2, 1970 and on which Ser. No. 266,792 was filed as a continuation on June 27, 1972; Ser. No. 71,204, filed Sept. 10, 1970; and Ser. No. 109,988, filed Jan. 26, 1971 and on which U.S. Pat. No. 3,694,371 issued on Sept. 26, 1972, and owned by the present assignee are disclosed several methods for precipitating activated apatites and processing them into halophosphate phosphors. In copending application Ser. No. 87,578, filed Nov. 6, 1970 on which U.S. Pat. No. 3,663,473 issued on May 16, 1972, and owned by the present assigneee, is disclosed a method in which an apatite is precipitated which contains one activator, a second activator is added by digesting after the pH is adjusted, and the apatite is then further processed to form a halophosphate phosphor.

BACKGROUND OF THE INVENTION

This invention relates to a method of producing halophosphate phosphors. The halophosphate phosphor family remains the most important commercially useful group of phosphors. The manganese- and antimony-activated calcium fluoro-chloro-apatite with or without supplementation by cadmium is the standard fluorescent lamp phosphor presently used. This phosphor is typically prepared by a solid state firing of the raw mix constituents, wherein the apatite structured phosphor is formed at a very high firing temperature. The crystal structure formed by such solid state reactions is hampered by transport and mobility limitations of the solid state reaction. The firing of raw mix constituents also requires costly furnace equipment and requires considerable time for firing, cooling, and grinding the material to a finely divided status.

In the aforementioned copending applications and in U.S. Pat. No. 3,538,014 issued Nov. 3, 1970 and U.S. Pat. No. 3,575,876 issued April 20, 1971, methods are disclosed for circumventing the difficulties of solid state firing, which methods form an apatite by precipitation. These precipitated apatites are then further processed to form halophosphate phosphors. For commercial production relatively large vessels are required for precipitation techniques as the volumes of the liquids used are large compared to the volume of the precipitated apatite.

SUMMARY OF THE INVENTION

A method is disclosed whereby apatite is formed by digesting (sometimes referred to as slurrying), rather than forming the apatite by solid state firing or by precipitation. As unactivated alkaline-earth metal fluoroapatite is formed by digesting predetermined amounts of an alkaline-earth metal acid phosphate and a fluoride of the same alkaline-earth metal which amounts are included in aproximately stoichiometric quantities as required to form the apatite. The unactivated fluoro-apatite is digested in a solution containing preselected activators to form an activated alkaline-earth metal fluoro-apatite. The activated fluoro-apatite is then washed and fired, under predetermined conditions to optimize the luminescence. Chlorine may be added during the firing process such that of fluoro-chloroapatite phosphor is formed.

BRIEF DESCRIPTION OF THE DRAWING

For a better understanding of the invention reference may be had to the accompanying drawing. The sole FIGURE is a flowchart illustrating the steps of a preferred method of preparing halophosphate phosphors in which the apatite is formed by a digestion process.

DESCRIPTION OF THE PREFERRED EMBODIMENTS

With reference to the sole FIGURE there is shown a flowchart of a preferred method used to produce halophosphate phosphor in accordance with this invention. Unactivated calcium fluoro-apatite is formed by a novel digestion of calcium acid phosphate with calcium fluoride. The reaction $9CaHPO_4 + CaF_2 \rightarrow 3Ca_c(PO_4)_2 \cdot CaF_2 + 3H_3PO_4$ is unexpected because $CaF_2$ is very insoluable in water. This digestion process between two particulate compounds is relatively rapid, generally requiring only 0.5 to 5 hours, and can take place in a relatively small vessel as both of the reaction constituents are in particulate form. The digestion may be continued until a predetermined pH IS achieved or for a predetermined period of time.

The unactivated calcium fluoro-apatite is then digested with a solution which contains antimony or antimony and manganese ions, thereby forming activated calcium fluoro-apatite. While it would be possible to incorporate the activators in the same digestion process in which the apatite was formed, it has been found that a better apatite structure is formed when the activators are added after the apatite is formed.

The fluoro-apatite is then washed. The wash may be initially with hot water rinses which are followed by an alcohol rinse.

The fluoro-apatite is then fired at above 1000°C and preferably at about 1180°C for one to three hours. The atmosphere preferably contains chlorine such that a fluorochloro-apatite phosphor is formed.

The following examples illustrate this invention:

EXAMPLE 1

The following ingredients are heated to 40°–100°C and stirred: 132 grams of $CaHPO_4$, 7.8 grams of $CaF_2$, 7.0 grams of $NH_4F$, and 2000 milliliters of water. When the pH of the above mixture has decreased to 2.5 TO 3.5 (approximately one hour) the following activator solution is added: 400 milliliters of water (at approximately 100°C), 3.8 grams of $Mn(C_2H_3O_2)_2 \cdot 4H_2O$, 1.6 grams of $Cd(C_2H_3O_2)_2 \cdot 3H_2O$, and 0.8 gram of $SbCl_3$. The mixture is further stirred for approximately one hour, washed two times by decantation and then washed with hot water on a filter. The precipitate is then fired in a nitrogen atmopshere at about 1000°C for approximately three hours to form a calcium fluoroapatite phosphor.

EXAMPLE 2

A fluoro-chloro-apatite phosphor is produced by the procedures specified in Example 1 by admixing ammonium chloride in the amount of 1–10 weight percent of the fluoro-apatite with the washed fluoro-apatite prior to firing. The amount of chloride addition is not critical, but is influenced by temperature, time of firing, and color of luminescence desired.

The digestion of calcium acid phosphate and calcium fluoride as described in Example 1 can be further speeded by the addition of citric acid in the amount of 0.1 to 5 percent of the water during the first digestion. This provides the added advantage that new calcium phosphates other than apatite will probably not be formed, as apparently all calcium phosphates other than apatite are soluble in citric acid.

While the above examples have been given using calcium as the alkaline-earth metal, the procedures also are effective for other alkaline-earth metals such as strontium.

While antimony or manganese and antimony are used as activators in the foregoing description, other activators, such as divalent europium, can be substituted.

I claim as my invention:

1. A method of preparing an activated alkaline-earth metal halophosphate phosphor having an apatite crystal structure, which method comprises:
   a. forming an unactivated alkaline-earth metal fluoro-apatite by slurrying in an aqueous medium predetermined amounts of a particulate alkaline-earth metal acid phosphate and a particulate fluoride of the same alkaline-earth metal, and said predetermined amounts being included in said aqueous medium in approximately stoichiometric quantities as required to form said apatite;
   b. slurrying said formed unactivated fluoro-apatite in an aqueous medium containing in solution preselected activators for said phosphor, to form activated alkaline-earth metal fluoro-apatite;
   c. washing said activated fluoro-apatite; and
   d. firing said washed fluoro-apatite at above 1000°C for a time sufficient to optimize the luminescence.

2. The method as specified in claim 1, wherein chlorine is incorporated into said halophosphate phosphor by admixing a readily volatilizable chlorine-containing compound with said washed fluoro-apatite prior to firing or by firing said washed fluoro-apatite in a chlorine-containing atmosphere.

3. The method as specified in claim 1, wherein said activators contained in said solution consist essentially of antimony or manganese and antimony.

4. The method as specified in claim 1, wherein said alkaline-earth metal is calcium and said unactivated fluoro-apatite is formed by slurrying $CaHPO_4$ and $CaF_2$ in water.

5. The method as specified in claim 4, wherein citric acid in the amount of 0.1 to 5.0 percent of said water is included during said slurrying of said $CaHPO_4$ and $CaF_2$.

6. The method as specified in claim 1, wherein said acid phosphate and said fluoride are slurried at 40°–100°C for a predetermined period of time of at least 0.5 hour.

7. The method as specified in claim 1, wherein said acid phosphate and said fluoride are slurried until a pH of 2.5 to 3.5 is achieved.

* * * * *